(12) United States Patent
Dunér (10) Patent No.: US 9,154,672 B2
(45) Date of Patent: Oct. 6, 2015

(54) MEANS AND METHOD FOR ASSISTING INSTALLATION OF MONITORING CAMERA

(75) Inventor: Henrik Dunér, Genarp (SE)

(73) Assignee: AXIS AB, Lund (SE)

( * ) Notice: Subject to any disclaimer, the term of this patent is extended or adjusted under 35 U.S.C. 154(b) by 272 days.

(21) Appl. No.: 13/315,400

(22) Filed: Dec. 9, 2011

(65) Prior Publication Data

US 2012/0147181 A1 Jun. 14, 2012

Related U.S. Application Data

(60) Provisional application No. 61/422,800, filed on Dec. 14, 2010.

(30) Foreign Application Priority Data

Dec. 9, 2010 (EP) ..................................... 10194306

(51) Int. Cl.
*H04N 7/18* (2006.01)
*H04N 5/225* (2006.01)
(Continued)

(52) U.S. Cl.
CPC .............. *H04N 5/2251* (2013.01); *G03B 17/02* (2013.01); *G03B 17/18* (2013.01)

(58) Field of Classification Search
CPC ................................ H04N 7/18; H04N 5/2251
USPC ........................................................ 348/143
See application file for complete search history.

(56) References Cited

U.S. PATENT DOCUMENTS

| 5,517,236 A | * | 5/1996 | Sergeant et al. .............. 348/143 |
| 5,541,697 A | | 7/1996 | McIntyre |
| 6,011,926 A | | 1/2000 | Cockell |

(Continued)

FOREIGN PATENT DOCUMENTS

| DE | 4121643 C1 | 11/1992 |
| DE | 19531289 A1 | 2/1997 |

(Continued)

OTHER PUBLICATIONS

Olympus Digital Camea E-P2 Instruction Manual; Internet citation: http://www.olympusamerica.com/files/E-P2_Instruction_Manual_EN.pdf, Jan. 1, 2009.

(Continued)

*Primary Examiner* — Thai Tran
*Assistant Examiner* — Nien-Ru Yang
(74) *Attorney, Agent, or Firm* — Volpe and Koenig, P.C.

(57) ABSTRACT

A monitoring camera includes at least one emitter of perceivable signals, a tilt sensor arranged to generate a signal representing a tilt value indicating a tilting angle of the monitoring camera, and an emitter driver arranged to drive the at least one emitter of perceivable signals in response to an adjustment indicating signal which is based on the tilt value signal. The monitoring camera may be arranged to perform a method including entering the camera into an installation mode, generating a tilt value signal at a tilt sensor within the monitoring camera, and indicating by means of at least one emitter of perceivable signals whether the monitoring camera is positioned in a desirable tilt or not based on the generated tilt value signal. The method may further include exiting the installation mode and entering into monitoring mode when satisfactory tilt is achieved.

15 Claims, 5 Drawing Sheets

(51) Int. Cl.
*G03B 17/02* (2006.01)
*G03B 17/18* (2006.01)

(56) References Cited

U.S. PATENT DOCUMENTS

| | | | |
|---|---|---|---|
| 2003/0071199 A1* | 4/2003 | Esping et al. | 250/221 |
| 2004/0075739 A1* | 4/2004 | Wada | 348/143 |
| 2005/0094994 A1* | 5/2005 | Paolantonio et al. | 396/427 |
| 2007/0103548 A1* | 5/2007 | Carter | 348/143 |
| 2008/0124064 A1* | 5/2008 | Klinghult et al. | 396/50 |
| 2011/0261196 A1* | 10/2011 | Gabel | 348/143 |

FOREIGN PATENT DOCUMENTS

| | | | | |
|---|---|---|---|---|
| JP | 2004312098 A | 11/2004 | | |
| WO | 9535627 A1 | 12/1995 | | |
| WO | 2010037367 A1 | 4/2010 | | |
| WO | WO 2010/037367 A1 * | 4/2010 | | G08B 29/04 |

OTHER PUBLICATIONS

Canon "Communication Software for the Camera—EOS Utility Ver 2.5 Instruction Manual", CT1-7166EUaWE-000; Internet citation, Jan. 1, 2009; Retrieved from the Internet Feb. 4, 2013; Canon Inc. 2008; 62 pages. URL:http://www.bhphotovideo.com/lit_files/103.pdf.

* cited by examiner

| POS | TWO LIGHT EMITTERS | | | | ONE LIGHT EMITTER | | MONO AUDIO EMITTER |
|---|---|---|---|---|---|---|---|
| | COLOUR | | FREQ | | COLOUR | FREQ | |
| | L1 | L2 | L1 | L2 | | | |
| 1 | R | Y | $f_3$ | $f_4$ | R | $f_{12}$ | $V_2$ |
| 2 | R | Y | $f_1$ | $f_2$ | R | $f_{11}$ | $V_1$ |
| 3 | G | G | $f_0$ | $f_0$ | G | $f_{10}$ | $V_0$ |
| 4 | Y | R | $f_2$ | $f_1$ | Y | $f_{11}$ | $V_1$ |
| 5 | Y | R | $f_4$ | $f_3$ | Y | $f_{12}$ | $V_2$ |

MEANS AND METHOD FOR ASSISTING INSTALLATION OF MONITORING CAMERA

CROSS REFERENCE TO RELATED APPLICATIONS

This application claims the benefit of U.S. provisional application No. 61/422,800 filed on Dec. 14, 2010, which is incorporated by reference as if fully set forth.

TECHNICAL FIELD OF THE INVENTION

The present invention generally relates to monitoring cameras. More specifically the present invention relates to means and methods for assisting installation of monitoring cameras.

BACKGROUND OF THE INVENTION

When studying or monitoring video from a monitoring camera it may be very annoying for the person monitoring if the video have a tilted horizon, tilted walls, a tilted floor, etc., or if the video hardly shows the interesting area of the image. Such drawbacks may have even worse implications than being simply annoying as they may affect the concentration and judgment of the person monitoring the video.

One common way to overcome such problems is to adjust the tilt and/or the direction of the camera by eye. Then the person make his way over to the monitoring center checking if the camera view is satisfactory. If not, the person has to get back to the camera, adjust it, and return to the monitoring center in order to check the result.

In order to facilitate the installation process a monitor, for viewing the camera view from the camera currently being installed, may be connected to the monitoring network closer to the camera, e.g. in case of an IP-based monitoring network a computer may be connected to a network hub or switch in the immediate surroundings. Yet another possible solution is to have another person studying a monitor displaying the video from the camera and reporting to the person making the adjustment at the camera. Alternatively, the person installing may use a specialized installation display, e.g. an AXIS T8412 Installation Display from Axis Communications AB, Emdalavägen 14, SE-223 69 Lund, SWEDEN, or an adaptor and an off the shelf video preview display as described in the published European Patent Application EP 2 144 443 by Axis AB.

Even if there are quite many ways to address the above discussed problem, the process of achieving a satisfactory mounting of the monitoring camera may still be laborious.

SUMMARY OF THE INVENTION

One object of the present invention is to facilitate installation of monitoring cameras.

The object is achieved by means of a method according to claim 1 and alternatively by means of a method according to claim 8. Further embodiments of the invention are presented in the dependent claims.

In particular, according to a first aspect of the present invention, the object is achieved by means of a monitoring camera comprising at least two light emitting devices, a tilt sensor arranged to generate a signal representing a tilt value indicating a tilting angle of the monitoring camera, an emitter driver arranged to drive the at least two light emitting devices, an installation mode in which the emitter driver is arranged to drive the at least two light emitting devices in response to an adjustment indicating signal which is based on the tilt value signal, and a monitoring mode in which the emitter driver is arranged to drive the at least two light emitting devices in response to a signal not being based on the tilt value signal. One advantage of making light emitting devices indicate desired adjustments based on the tilt of a tilt sensor, thereby also the camera, is that it may facilitate installation of the monitoring camera. This arrangement may for instance make it possible for a person installing the monitoring camera to adjust the monitoring camera to the correct tilt angels or leveling a monitoring camera that are to be arranged horizontally. The monitoring camera is arranged to enable the monitoring camera to operate in an installation mode and in a monitoring mode, in the installation mode the emitter driver is arranged to drive the at least two light emitting devices based on the tilt value signal and in the monitoring mode the emitter driver is arranged to drive the at least two light emitting devices based on another signal than the tilt value signal. One advantage of these features is that the monitoring camera may be made small as the different modes are enabled to use the same emitter of perceivable signals. Another advantage is that the installation may be further facilitated in that the two modes introduces clear distinction between signaling relating to different operations even if the same signaling interface is used.

In the context of the present specification, claims, and figures the act of installing is to be understood as an act of placing, fixing, or setting up something, e.g. a monitoring camera, in position for use.

According to another embodiment the monitoring camera further comprises a storing means storing a predetermined tilt value and a comparing means arranged to compare the tilt value from the tilt sensor and the predetermined tilt value and arranged to generate the adjustment indicating signal based on the difference between the tilt value from the tilt sensor and the predetermined tilt value for the emitter driver. This is advantageous in that the camera may be preset for installation at a particular tilt angle and that it is enabling the person installing the monitoring camera to simply adjust the monitoring camera until it indicates that it is correctly tilted. Hence, this embodiment particularly facilitates installation of monitoring cameras that are to be installed at a specific tilt angle.

In one embodiment, the at least one emitter of perceivable signals is a light emitting device. This is further contributing to make the monitoring camera small.

In one particular embodiment, the emitter driver is arranged to drive two light emitting devices based on the adjustment indicating signal. The advantage of having two light emitting devices is that it enables the camera to indicate a requested tilt direction in a way that is easily understandable by the person performing the installation. Moreover, if the monitoring mode of the camera already requires two light emitting devices this feature does not increase the size of the camera.

Further, the emitter driver may be arranged to drive a first one of the two light emitting devices to emit light and a second one of the two light emitting devices not to emit light when the adjustment indicating signal indicates that the monitoring camera should be tilted in a first direction, and wherein the emitter driver is arranged to drive the second one of the two light emitting devices to emit light and the first one of the two light emitting devices not to emit light when the adjustment indicating signal indicates that the monitoring camera should be tilted in a second direction.

According to another embodiment, the at least one emitter of perceivable signals is an audio emitting device. The use of sound may be advantageous in situations where the monitoring camera is mounted in a position making the light emitting devices difficult to see.

According to another aspect of the invention, the object of the invention is achieved by means of a method in a monitoring camera for assisting installation. The method comprises entering the camera into an installation mode. When in the installation mode, the method comprises generating a tilt value signal at a tilt sensor within the monitoring camera, and indicating, by at least two light emitting devices, whether the monitoring camera is positioned in position of a desirable tilt or not based on the generated tilt value signal, and exiting the installation mode entering into monitoring mode when satisfactory tilt is achieved. Then, when in monitoring mode the method further comprises indicating, by the at least two light emitting devices, states of the monitoring camera based on signals not being related to tilt value signals from the tilt sensor within the monitoring camera. One advantage of making any light emitting devices indicate adjustments based on the tilt of a tilt sensor, and thereby the camera, is that it may facilitate installation of the monitoring camera. This arrangement may for instance make it possible for a person installing the monitoring camera to adjust the monitoring camera to the correct tilt angles or leveling a monitoring camera that are to be arranged horizontally. Moreover, an advantage of the separate modes is that the monitoring camera may be made small as the different modes are enabled to use the same emitter of perceivable signals. Another advantage with these modes is that the installation may be further facilitated in that the different operation and thus the signaling of the camera are distinctly separated by introduction of the two modes.

In one embodiment, when monitoring camera is in installation mode, the method comprises comparing the tilt value signal from the tilt sensor with a predetermined tilt value. Hence, this embodiment particularly facilitates installation of monitoring cameras that are to be installed at a specific tilt angle.

In another embodiment, the at least two light emitting devices do not indicate whether the monitoring camera is positioned in position of a desirable tilt or not based on the generated tilt value signal when the monitoring camera is in monitoring mode.

In yet another embodiment, the act of indicating, when the monitoring camera is in installation mode, includes varying a frequency of the perceivable signal based on the tilt value signal.

In yet another embodiment, the act of indicating, when the monitoring camera is in installation mode, includes varying the color of the light emitted based on the tilt value signal.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF EMBODIMENTS

Before the invention is described in detail, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps. Moreover, in the figures like reference characters designate like or corresponding parts throughout the several figures.

Figure 1:
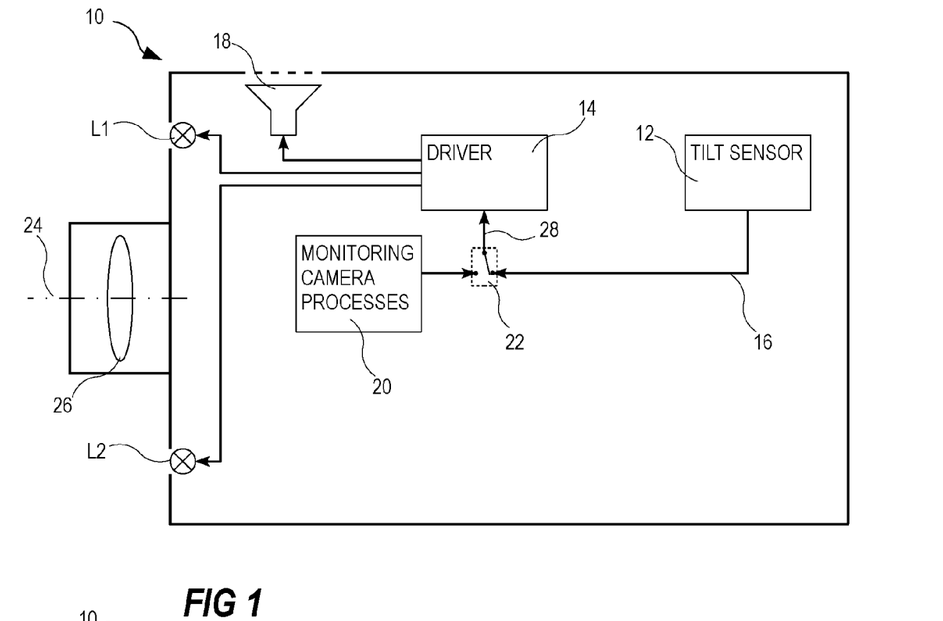
FIG. 1 shows a schematic block diagram of a monitoring camera according to one embodiment of the present invention.

Now referring to FIG. 1, a camera 10 according to one embodiment of the invention includes a tilt sensor 12 arranged to output a signal indicating the inclination or tilt of the monitoring camera in relation to the gravity of the earth and to provide an emitter driver 14 with a tilt value signal 16, which in this embodiment also represent an adjustment indicating signal as this embodiment uses the tilt value signal 16 for indicating required adjustment of the tilt of the monitoring camera 10. The emitter driver 14 is then connected to one or a plurality of emitters of perceivable signals L1, L2, 18. A perceivable signal is to be understood as a signal that a person may become aware of by using one of his/hers senses, e.g. sight or hearing. Accordingly, an emitter of perceivable signals may be light emitting devices L1, L2, e.g. Light Emitting Diodes (LEDs), lamps, lasers, etc, or may be a mono or stereo audio emitter 18, e.g. one or a plurality of speakers, a mono or stereo earphone connector, etc. Further, the monitoring camera 10 includes means and devices for operating the camera as a monitoring camera, these means and devices are indicated in the figure as a block for general monitoring camera processes 20. The means and devices 20 required in a monitoring camera 10 for normal operation is well known to the person skilled in the art and, thus, are not described in any detail in the present description. Generally the normal monitoring operation of the monitoring camera 10 may also require signaling using signals perceivable by persons in the vicinity of the monitoring camera 10. In this embodiment the monitoring camera 10 is arranged to have the signaling from the tilt sensor 12 be presented to the surroundings by one or a plurality of emitters of perceivable signals L1, L2, 18 when the monitoring camera 10 is in an installation mode and then returning the use of any of these emitters of perceivable signals L1, L2, 18 for use by the general monitoring camera processes 20.

As discussed above the monitoring camera 10 is arranged to operate in at least two modes, an installation mode and a monitoring mode. One difference between the two modes is that when in installation mode the emitter driver 14 output signal are based on the tilt value signal 16 from the tilt sensor 12 and when in monitoring mode the emitter driver 14 output signals based on information/signals provided by the general camera process 20, e.g. LAN/WLAN status, event signaling, power indicator, mode indicator, status indicator, etc. This shift of the origin of the signal upon which the emitter driver 14 bases its output is represented by a switch 22 in the figures. Hence, in monitoring mode the camera may be arranged not to have any perceivable indication at the camera relating to the tilt of the camera.

The tilt sensor 12 may be single axis tilt sensor 12, i.e. a tilt sensor which is only indicating the tilt of the monitoring camera 10 around one tilt axis. In the context of the present description, the word tilt should be understood as slanting, inclining the device, or turning the device around a particular axis. This slanting or inclining may be related to the horizontal plane. The single axis sensor 12 may for instance be arranged to detect the monitoring camera's 10 tilt around an axis essentially parallel with an optical axis 24 of an optical input 26 of the camera 10, or the camera's tilt around an axis transversal to the optical axis 24. Further, the tilt sensor 12 may as well be a dual axis tilt sensor 12, i.e., a tilt sensor indicating the tilt of the monitoring camera 10 around two substantially orthogonal axes. Such sensor may be arranged to detect the camera's tilt around an axis essentially parallel with an optical axis 24 of an optical input 26 of the camera 10 and around an axis transversal to the optical axis 24. According to one specific embodiment, the transversal axis is an axis essential parallel with any one of the edges in an image plane of an image sensor of the monitoring camera 10. This may, in one particular embodiment mean that the transversal axis is arranged in a horizontal plane when the monitoring camera 10 is tilted around the optical axis 24 to provide a level view of the surroundings. Further, the tilt sensor 12 may be a three axis tilt sensor 12, i.e. a tilt sensor indicating the tilt of the monitoring camera 10 around three substantially orthogonal axes.

A single axis tilt sensor, dual axis tilt sensor or a three axis tilt sensor may be an assembly of mercury switches, tilt switches, rolling ball sensors, liquid capacitive sensors, electrolytic sensors, gas bubble in liquid sensors, pendulum sensors, and accelerometers. Accelerometers for single axis, dual axes or three axes are available as prefabricated components. The accelerometer may be a microelectromechanical system, MEMS, device. Accordingly, the tilt sensor 12 may be any sensor known to the skilled person that is capable of measuring the tilt of the monitoring camera 10 and provide an output relating to this measurement. In order to facilitate the understanding of the invention, the tilt sensor will hereinafter be described as if it was based on an accelerometer. Hence, the tilt sensor 12 is arranged to generate signals indicating the tilt of the camera around one or a plurality of predetermined axes.

The emitter driver 14 receives an input signal 28 from either the tilt sensor or the monitoring camera process 20, depending on the present mode of the camera. The input signal 28 to the emitter driver 14 is transformed into a signal that may be used to drive at least one of the emitters of perceivable signals L1, L2, 18.

The functionality of the switch 22 may be implemented as a software switch arranged to select data from different sources depending on the present mode of the monitoring camera 10 or as a hardware switch controlling which signal path that is presently provided to the emitter driver 14 depending on the present mode of the monitoring camera 10. The switching between installation mode and monitoring mode and vice versa may be initiated by means of a user pressing a key or switches a physical switch arranged on the camera, not shown in the figures. The monitoring camera 10 may also be arranged to enter installation mode automatically as part of a start up procedure in response to the monitoring camera 10 being powered on. The transition from installation mode to monitoring mode may then be initiated by means of a manual operation, e.g. a user pressing a key, or the monitoring camera 10 may be arranged to automatically switch to monitoring mode when the monitoring camera 10 is correctly installed in view of the tilt sensor 12 and the tilt value signal 16.

Figure 2:
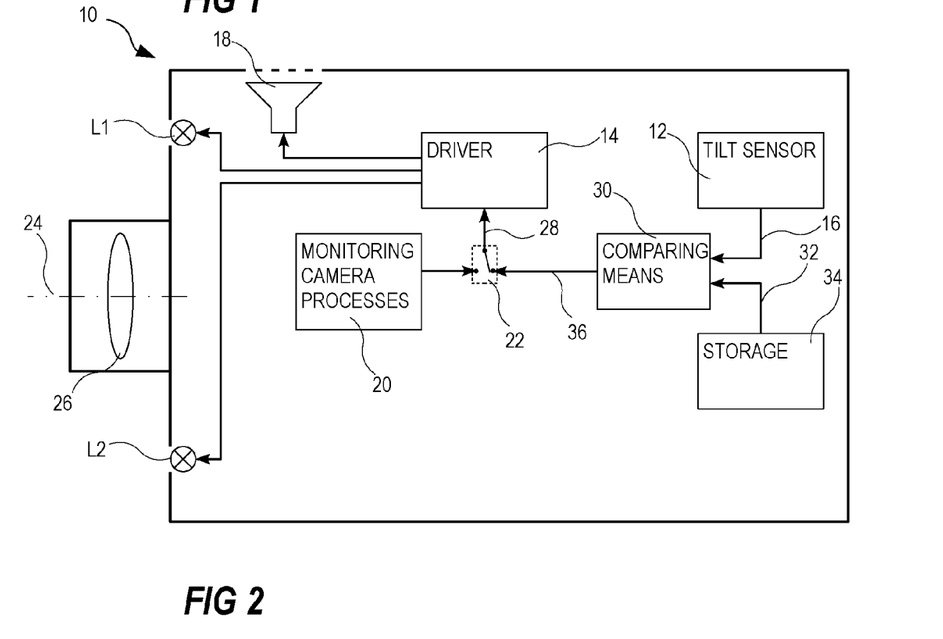
FIG. 2 shows a schematic block diagram of a monitoring camera according to another embodiment of the present invention.

According to another embodiment, see FIG. 2, the monitoring camera 10 includes a comparing means 30 which is arranged to compare the tilt value signal 16 with a predetermined tilt value signal 32. The predetermined tilt value signal 32 may be a signal value stored in a memory 34 in the monitoring camera 10 from which memory 34 a signal is generated. The comparing means 30 may alternatively be arranged to compare the value of the tilt value signal 16 with a predetermined tilt value stored in a memory 34 of the monitoring camera 10. The output from the comparing means 30 may be an adjustment indicating signal 36 representing the difference between the tilt value signal 16 and the predetermined tilt value signal 34, i.e., the error. Alternatively, the output is an adjustment value representing the difference between the tilt value and the predetermined tilt value. This adjustment value signal 36 is then forwarded to the emitter driver 14 via the mode switch 22. The rest of the design and functionality may correspond to the design and functionality of the monitoring camera 10 of FIG. 1. By introducing the comparison of the tilt value signal 16 with a predetermined tilt value signal 34, it is possible to easily configure a monitoring camera 10 to indicate correct tilting at various angles for different installations or different positions within a monitoring area, see example below.

Figure 3:
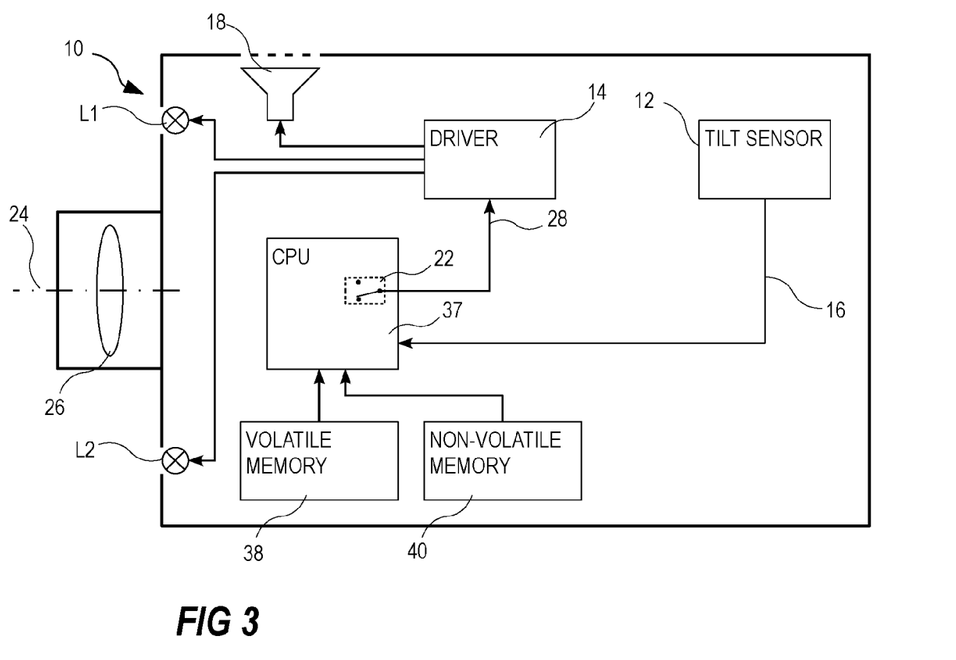
FIG. 3 shows a schematic block diagram of a monitoring camera according to yet another embodiment of the present invention.

According to yet another embodiment, see FIG. 3, the tilt sensor 12 provides a tilt value signal 16 to a Central Processing Unit 37 which is arranged to operate in accordance with a program code including an implementation of the function of the installation mode as described in reference to FIG. 1 or of the function of the installation mode as described in reference to FIG. 2. This embodiment may utilize a volatile memory 38 for use as a working memory and a non-volatile memory 40 for storing program code for operating the monitoring camera 10 in the monitoring mode and in the installation mode, respectively. The switching of signals presented to the emitter driver 14 operated by the mode switch 22 may also be implemented in software, e.g. by simply making the central processing unit 37 select the proper value or signal to present to the emitter driver 14 as the input signal 28. When implementing an embodiment in which the tilt signal value 16 is compared to a predetermined tilt value signal 32, the predetermined tilt value signal 32 may be data stored in the non-volatile memory 40, in the volatile memory 38, in a register (not shown), etc. This predetermined tilt value signal 32 value may then be compared with the tilt signal value 16 by means of an operation being executed in the CPU 37.

Figure 4:
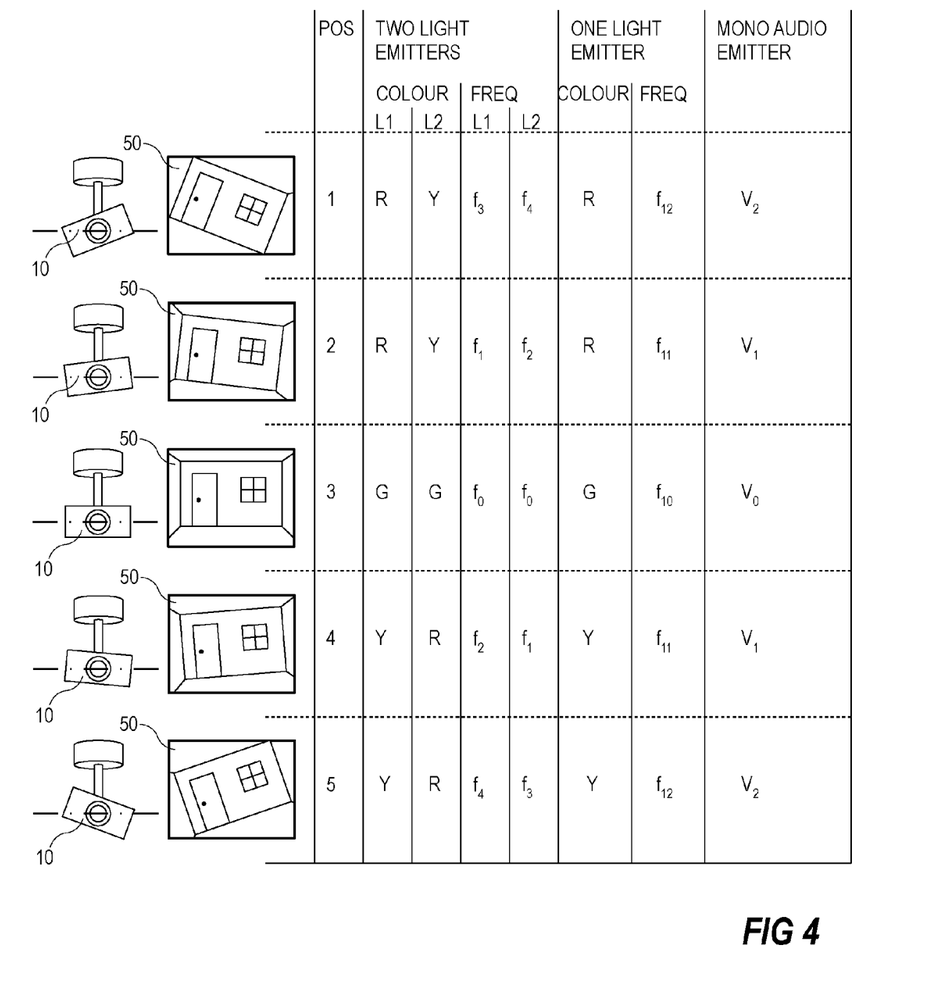
FIG. 4 shows various examples of how to indicate when a monitoring camera is erroneously or correctly mounted.

In FIG. 4, various signaling examples are given in relation to a monitoring camera 10 being configured to be mounted at substantially zero degree tilt around the optical axis, i.e. horizontal. In a first example, tagged in the table as "TWO LIGHT EMITTERS, COLOUR, L1 AND L2", the monitoring camera 10 is provided with two light emitters L1, L2, which are arranged to change color based on the driving signal from the emitter driver 14. In the situation called POS 1 in the table of FIG. 4, the camera is tilted to the left resulting in the camera view 50 depicted next to the monitoring camera 10 and resulting from this tilt the left light emitter L1 is emitting red light R and right light emitter L2 is emitting yellow light Y. Hence, indicating for the person performing the installation that the monitoring camera 10 is not yet arranged at the required tilt angle. In POS 2 the monitoring camera 10 is less tilted to the left than in POS 1, but nevertheless tilted and not arranged at the required tilt angle. Therefore the left light emitter L1 and the right light emitter L2 still presents a red light R and a yellow Y light, respectively. In POS 3 the monitoring camera 10 is arranged substantially horizontal, i.e. substantially no tilt angle, and this is indicated by the camera by having the two light emitters L1, L2, emit green light, since this corresponds to the requested tilt in this particular case. In POS 4 the monitoring camera 10 is tilted slightly to the right and the left light emitter L1 is set to emit yellow light Y while the right light emitter L2 is set to emit red light R. This is the opposite color scheme in relation to the monitoring camera 10 being tilted to the left for the reason of indicating to the user which direction to tilt the monitoring camera 10 in order to arrive at the desired tilt angle, e.g. zero tilt angle as in this example. In POS 5 the monitoring camera 10 is further tilted to the right and the light emitters L1, L2, are showing yellow Y and red R, respectively.

In another signaling example, see column "TWO LIGHT EMITTERS, FREQ, L1 and L2", the light emitters L1 and L2 are arranged to indicate the tilt angle by means of adjusting a blinking frequency of the light emitting devices L1, L2. In POS 3, representing the correctly tilted monitoring camera 10, both the light emitters L1, L2 are blinking with frequency $f_0$. Then, depending on the tilting direction the two light emitters L1, L2 are blinking at different frequencies, e.g. if the monitoring camera 10 is tilted to the left the right light emitter L2 may blink at higher frequency than the left one L1. In this way it is possible to indicate that the monitoring camera 10 is to be tilted to the right.

In yet another signaling example, see the column "ONE LIGHT EMITTER, COLOR", the monitoring camera is using only one single light emitter L1 to indicate if the tilting angle is correct or not. In this particular example the light emitter L1 indicates that the camera is tilted to the left by making the light emitter L1 emit red light R and to the right by making the light emitter L1 emit yellow light Y. When the camera is correctly tilted the light emitter L1 is emitting green light G.

In another signaling example, see the column "ONE LIGHT EMITTER, FREQ", the monitoring camera 10 once more is using only one light emitter L1. However, this time the tilt is indicated by means of a blinking frequency $f_{10}$, $f_{11}$, $f_{12}$. The frequencies may for instance be set as follows: $f_{10} < f_{11} < f_{12}$, indicating that the higher the frequency the greater the erroneous tilting angle. The correct tilt angle may be indicated by $f_{10} = 0$, i.e. constant light.

In another signaling example, see the column "MONO AUDIO EMITTER" the deviation from the correct tilting angle may be indicated by increasing sound volume, e.g. $V_0 < V_1 < V_2$. Alternatively, a change in frequency may be used. Moreover, stereo audio may be used in order to indicate direction.

When the camera indicates that it is arranged substantially horizontal, POS 3 in the table of FIG. 4, the monitoring camera may be arranged to automatically switch to monitoring mode or to another adjustment phase of the installation mode. The switching may also be implemented to require a manual operation such as the user pressing a key.

Moreover, any combination of the above examples may be used, i.e. having light emitters both changing color and blink frequency.

Figure 5:
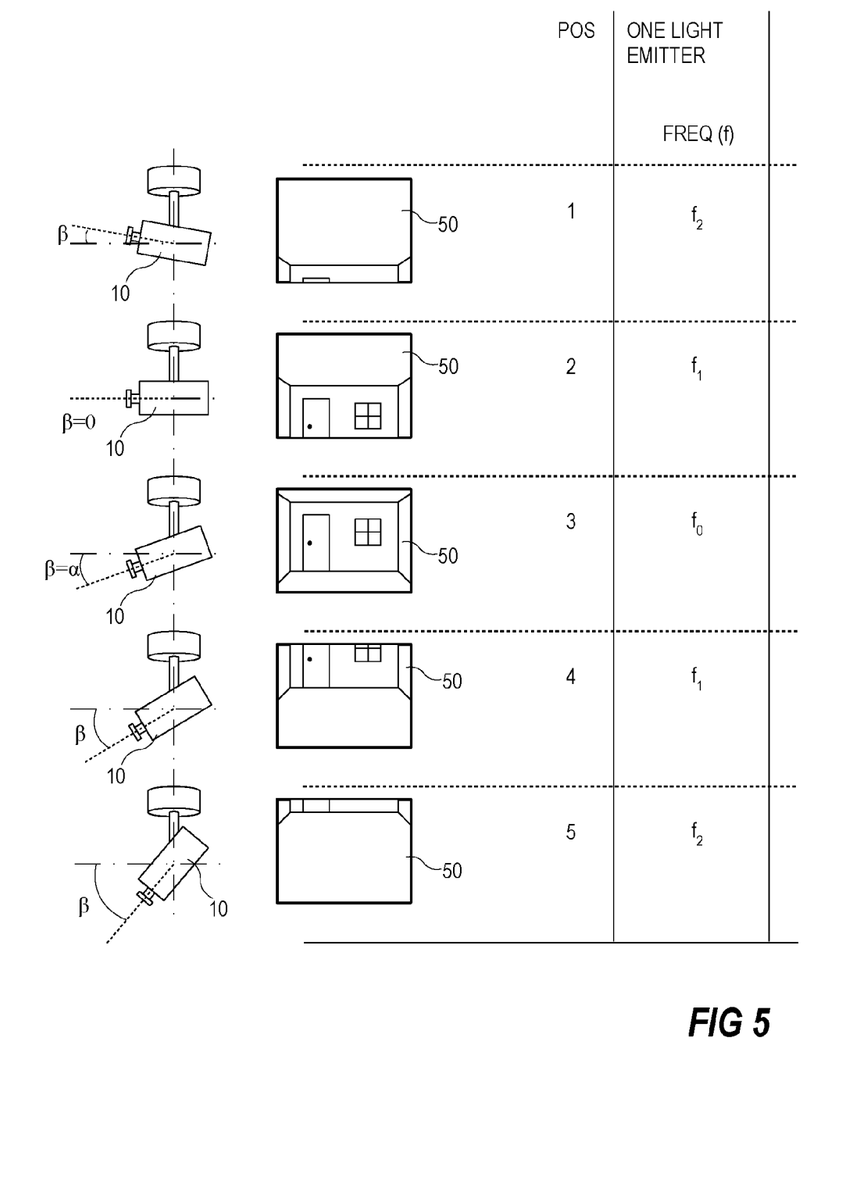
FIG. 5 illustrates possible signaling from a camera being provided with a predetermined tilt angle.

As discussed above, the desired tilting angle may not necessarily be set to horizontal, but rather to a predetermined angle. A predetermined tilting angle may be set for one or a plurality of axes. In FIG. 5, an example of tilting the camera a predetermined angle is illustrated. FIG. 5 illustrates an example in which a monitoring camera 10 is mounted in the ceiling and is required to be tilted downwards by α degrees in order to present the desired camera view 50 presented in the Figure at position POS 3. As seen in FIG. 5, the monitoring camera 10 is angled too far towards the ceiling in POS 1-2 and too far towards the floor in POS 4-5, i.e., the camera angle β does not correspond to the predetermined angle α. The indicating of the camera being tilted correctly or erroneously may be indicated applying any of the signaling methods and schemes presented in the description of FIG. 4. As it is evident from the present description that any of these schemes described are possible to apply to the situation of FIG. 5, only one signaling scheme is presented in FIG. 5. The signaling in FIG. 5 describes the use of one light emitter L1 being driven to present different frequency, $f_0$-$f_2$, blinking depending on the angular distance in tilt from the predetermined angle α. According to one embodiment, the frequency is greater the further away from the predetermined tilt angle α the present tilt angle β of the camera is, i.e. $f_0 < f_1 < f_2$. The frequency may be expressed as being proportional to the difference between camera angle β and the predetermined angle α, i.e., $f \sim |\beta - \alpha|$.

By enabling presetting of an predetermined tilting angle, it is possible for a designer of a monitoring installation to pre calculate the desired angle during a design phase and then either see to that each monitoring camera in question could be preset and tagged for a specific position or provide the tilting angle to the person mounting the camera who then may enter the predetermined tilting angle into the camera.

Figure 6:
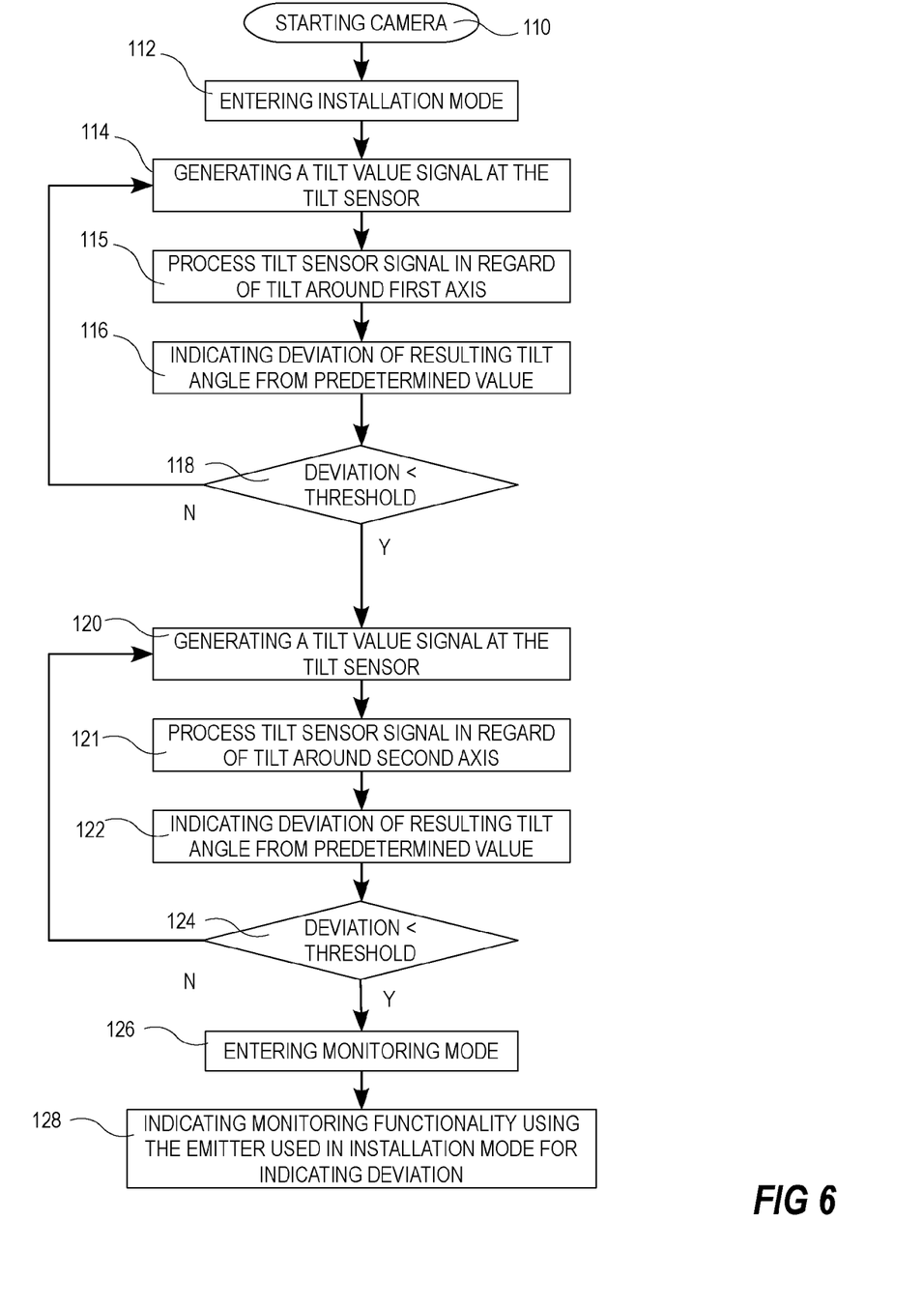
FIG. 6 is a schematic flowchart illustrating functionality of the monitoring camera in accordance with one embodiment of the present invention.

Now referring to FIG. 6, a process according to one embodiment of the present invention is illustrated. The process relates to the installation of a monitoring camera. When the monitoring camera 10 is mounted and ready for in place adjustments, e.g., see to that the monitoring camera is installed horizontally or at a predetermined tilt angle, the monitoring camera 10 is powered up, step 110, and the monitoring camera automatically enters installation mode, step 112. In installation mode the tilt sensor 12 generates tilt value signals, step 114. These tilt value signals are processed, step 115, and the deviation of the present tilt angle around a first tilt axis substantially parallel to the optical axis 24 of the monitoring camera 10 from a predetermined tilt angle around the same first tilt axis, is determined. This deviation is then indicated, step 116, by means of at least one emitter of perceivable signals, L1, L2, 18. The indication is intended to be noticed by a person adjusting the monitoring camera 10 and thereby making this person adjust the tilt of the camera if necessary. The predetermined tilt angle around the optical axis may be zero, i.e. horizontal. If the deviation is less than a predetermined threshold, e.g., substantially zero, step 118, then the process continues to step 120, else the process continues generating and processing the tilt value signals 16 in regard of tilt around the optical axis 24 by returning to step 114. The process may also proceed to step 120 by means of a user pressing a key on the monitoring device 10.

In step 120, the tilt value signals 16 are generated and then processed, step 121, but this time in order to determine a deviation of the present tilt angle around a second tilt axis substantially transversal to the optical axis from a predetermined tilt angle around the second tilt axis. The second tilt axis may be an axis orthogonal to the optical axis 24 and substantially parallel to a line representing a horizontal line in the image view when the monitoring camera 10 is mounted for monitoring. This deviation is then indicated, step 122, by means of at least one emitter of perceivable signals, L1, L2, 18. The indication is intended to be noticed by a person adjusting the camera and thereby making this person adjust the tilt of the camera if necessary. If the deviation is less than a predetermined threshold, e.g. substantially zero, step 124, then the process continues to step 126, else the process continues generating and processing the tilt value signals in regard of tilt around the optical axis by returning to step 120. The process may also proceed to step 126 by means of a user pressing a key on the monitoring device 10.

In step 126, the monitoring camera 10 exits the installation mode and enters the monitoring mode. Then the at least one emitter of perceivable signals, L1, L2, 18 no longer is presenting signals relating to an output from the tilt sensor but is rather presenting signals based on monitoring related functions and characteristics, step 128.

The at least one emitter of perceivable signals, L1, L2, 18, used to indicate tilt angle deviation around the first axis may be a different at least one emitter than the at least one emitter of perceivable signals, L1, L2, 18, used to indicate tilt angle deviation around the second axis.

The step of processing tilt sensor signals, steps 114 and 120, may include advanced processing of tilt value signals from the tilt sensor 12 and comparison of such tilt value signals with predetermined tilt values. In another embodiment the step of processing tilt sensor signals, steps 114 and 120, may include processing the tilt value signal in a comparator circuit comparing the tilt value signal with a signal representing a predetermined tilt value.

The invention claimed is:

1. A method for assisting installation of a stationary monitoring camera, comprising:
    pre-calculating a predetermined tilt value in order to preset and tag the monitoring camera for a specific mounting or installation position;
    the method further comprising in the camera:
    storing the predetermined tilt value in a memory;
    generating a tilt value signal at a tilt sensor within the monitoring camera;
    comparing the tilt value signal from the tilt sensor with the predetermined tilt value; and
    indicating, via at least one of a light emitting device and an audio emitter, whether the monitoring camera is positioned in position of a desirable tilt or not based on the comparison.

2. The method according to claim 1, wherein the predetermined tilt value represents a tilt angle not representing a horizontal orientation.

3. The method according to claim 1, wherein the predetermined tilt value represents a tilt angle around an axis transversal to the optical axis of the monitoring camera.

4. The method according to claim 1, wherein the predetermined tilt value represents a tilt angle around an axis parallel with the optical axis of the monitoring camera.

5. The method according to claim 1, further comprising:
    entering the monitoring camera into an installation mode and when in the installation mode, performing the acts of generating, comparing and indicating; and
    exiting the installation mode and entering into monitoring mode when satisfactory tilt is achieved and then when in monitoring mode, indicating, via the one of the light emitting device and the audio emitter, general monitoring camera process information/signals.

6. The method according to claim 5, wherein said exiting the installation mode and entering into monitoring mode is performed by operating a switch.

7. The method according to claim 5, wherein a transition from installation mode to monitoring mode is initiated by a manual operation.

8. The method according to claim 5, wherein a transition from installation mode to monitoring mode is initiated automatically when the monitoring camera is positioned in position of the desirable tilt.

9. The method according to claim 5, wherein said entering the monitoring camera into installation mode is performed in response to the monitoring camera being powered on.

10. The method according to claim 5, wherein the one of the light emitting device and the audio emitter do not indicate whether the monitoring camera is positioned in position of a desirable tilt or not based on the act of comparing when the monitoring camera is in monitoring mode.

11. The method according to claim 1, wherein the act of indicating includes varying a frequency of at least one of light and sound from the at least one of the light emitting device and the audio emitter based on the act of comparing.

12. The method according to claim 1, wherein the act of indicating includes varying the color of light from the light emitting device based on the act of comparing.

13. The method according to claim 1, wherein the memory for storing the predetermined tilt value is comprised in the monitoring camera.

14. The method according to claim 1, wherein the comparing of the tilt value signal from the tilt sensor with the predetermined tilt value is performed by a comparator within the monitoring camera.

15. The method according to claim 1, wherein the at least one of the light emitting device and the audio emitter is comprised in the monitoring camera.

* * * * *